United States Patent [19]

Wiley

[11] 3,995,501
[45] Dec. 7, 1976

[54] SHEAR AND COMPRESSION WAVE TESTING AND MEASURING DEVICE

[75] Inventor: Bruce F. Wiley, Bartlesville, Okla.

[73] Assignee: Phillips Petroleum Company, Bartlesville, Okla.

[22] Filed: Aug. 7, 1975

[21] Appl. No.: 602,868

Related U.S. Application Data

[60] Continuation-in-part of Ser. No. 518,854, Oct. 29, 1974, abandoned, which is a continuation of Ser. No. 322,260, Jan. 9, 1973, abandoned, which is a division of Ser. No. 28,368, April 14, 1970, abandoned.

[52] U.S. Cl. .............................. 73/560; 73/67.5 R
[51] Int. Cl.² ....................................... G01H 5/00
[58] Field of Search ............... 73/67.5 R, 67.6, 560

[56] References Cited

UNITED STATES PATENTS

| | | | |
|---|---|---|---|
| 3,354,983 | 11/1967 | Erikson et al. | 340/15.5 |
| 3,537,541 | 11/1970 | Desai | 73/560 |

OTHER PUBLICATIONS

J. Van Steveninck, Apparatus for Simultaneous Determination of Longitudinal and Shear Wave Velocities Under Pressure, Journal of Scientific Instruments, 1967, vol. 44, p. 379-381.

*Primary Examiner*—Richard C. Queisser
*Assistant Examiner*—John P. Beauchamp

[57] ABSTRACT

A new location arrangement is made of a shear transducer in a transducer sonic velocity apparatus, as for core testing, in which a shear transducer is placed between or next to a contact piece and a compression transducer so that loading of the shear generator by the compression transducer is avoided. In another embodiment, both the shear and compressional transducers are at substantially the same point or in the same plane so that the time zero is the same for both the compressional and shear measurements. In another embodiment, the shear transducer surrounds, but does not contact, the compressional transducer, and both the shear and compressional transducers contact a mounting plate or platen in about the same plane so that the time zero is the same for both the compressional and shear measurements.

Increased shear and compressional signals can be obtained by placing an oil depending film between a shear and its corresponding compressional transducer. In another embodiment, an oil decoupling film is provided between a compressional transducer, which is surrounded by a shear transducer, and a platen or contact piece which decouples the compressional transducer from the shear transducer.

15 Claims, 11 Drawing Figures

INVENTOR.
B. F. WILEY

BY

ATTORNEYS

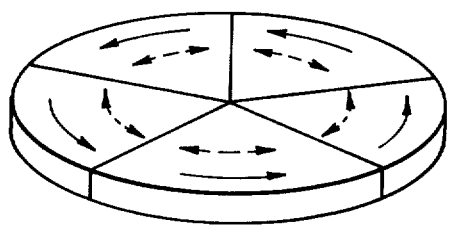
FIG. 4
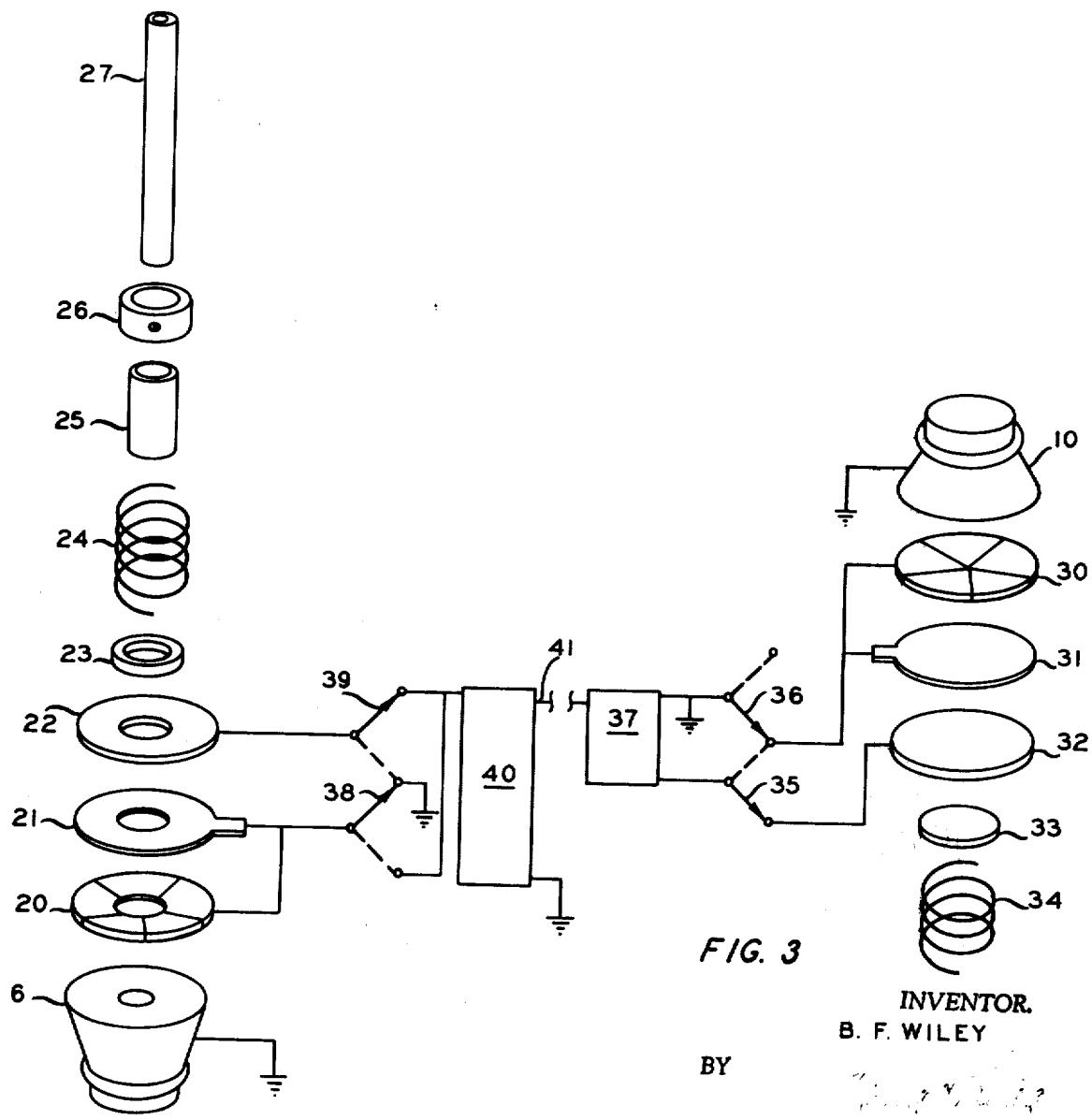
FIG. 2
FIG. 3
INVENTOR.
B. F. WILEY
BY
ATTORNEYS

SHEAR AND COMPRESSION WAVE TESTING AND MEASURING DEVICE

This is a continuation-in-part application of my copending application having Ser. No. 518,854, filed Oct. 29, 1974, now abandoned, which was a continuation application of Ser. No. 322,260, filed Jan. 9, 1973, now abandoned, which in turn was a divisional application of Ser. No. 28,368, filed Apr. 14, 1970, now abandoned.

This invention relates to a new location arrangement of a shear transducer as in a device in which a compression transducer is also employed.

In one of its concepts, the invention provides a shear transducer which can be either a transmitter and/or a receiver which is cut from a piece or bar of material, for example, lead zirconium titanate, and which has the form in one embodiment thereof of a segmented pie constructed of pieces of the material and so arranged that when subjected to a high frequency alternating electrical pulse, the combination of the pieces so arranged will engender a rotational torque; in a now preferred form, the shear transducer being shaped of several pie-shaped wedges or cuts or pieces arranged so that direction of polarization in all of them, lying in a plane, as in the form of a wafer, will be the same, thus to produce an important increase in torque applied, and which, when applied to, say, a cylindrical core piece, for analysis of its porosity and other characteristics as can be determined by sonic velocities therethrough, will give a symmetrical wave throughout the cylindrical core piece, thus giving results which are more homogeneous and, therefore, more fully representative of the characteristics of all parts of the piece, said shear transducer being provided in a new location arrangement in a transducer sonic velocity apparatus as for core testing next to a contact piece, that is, between a contact piece abutting an end of a core to be tested and a compression transducer, permitting to avoid loading the path of travel of any shear impulse with the compressional transducer, that is, the compressional transmitter and/or receiver during shear sine wave transmission.

In a further concept of the invention, a shear transducer is formed of pie-shaped segments bonded to the end of a mounting plate or platen and through an enlarged axial opening in the shear transducer a small, but thicker, compressional transducer is mounted and coupled to the mounting plate or platen.

A further concept of the invention provides a new arrangement of any shear transducer and any compressional transducer in which in a core tester the shear transducer is placed between a contact piece and a compressional transducer.

In another concept of the invention, a ring-shaped, segmented shear transducer surrounds, but does not contact, a smaller, but thicker, compressional transducer, and both the shear and compressional transducers contact the surface of a platen in the same plane so that the time zero is substantially the same for both the compressional and shear measurements.

In a still further concept of the invention an oil decoupling film is provided between a compressional and a shear transducer arranged as herein described.

In still a further concept of the invention, an oil or grease decoupling film which decouples a compressional transducer from a shear transducer is provided between a compressional transducer and a platen arranged such that the compressional transducer is surrounded by, but not contacted with, a shear transducer and wherein the shear and compressional transducers contact the platen in about the same plane.

The testing of materials to determine their various characteristics as by passing sonic or other impulses or vibrations therethrough is known. Thus, the determining of the velocity of shear waves and longitudinal waves in porous media under either hydrostatic or axial loading or both to simulate conditions as in a well, that is, in the formation surrounding a well, has been practiced for some time. Thus, it is known that, depending upon the density or porosity of a material, the velocity of a sine wave or other impulse, however created therethrough, will vary. As is known, the velocity of transmission is all the greater that the material is more dense.

Those skilled in the art will have as background information within the scope of their knowledge the information which is evident from the following references.

"Apparatus for Simultaneous Determination of Longitudinal and Shear Wave Velocities Under Pressure," Journal Scientific Instruments, 1967, Vol. 44, Pages 379–381, and information in the footnote references of the article.

"Ultrasonic Shear-Wave Velocities in Rocks Subjected to Simulated Overburden Pressure," Geophysics, Vol. XXVII, No. 5, October, 1962, Pages 590–598 and footnote references to the article.

"Producing Motion with Magnetostrictive and Piezoelectric Transducers," Electrical Manufacturing, December, 1955, Pages 40–43.

U.S. Pat. No. 3,213,358, Raymond G. Piety, Oct. 19, 1965.

U.S. Pat. No. 3,329,931, Denis R. Tanguy, July 4, 1967.

The information of the references to the art, as shown therein, is incorporated herein by reference. Accordingly, in that which follows, the reader is assumed to be familiar with that art.

I have conceived of an arrangement for a core tester apparatus wherein a shear transmitter and/or shear receiver is placed in juxtaposition to the contact piece or pieces between which the core to be tested is clamped.

I have also conceived of an arrangement for a core logging apparatus wherein a ring-shaped shear transducer, i.e., a shear transmitter and/or a shear receiver, surrounds, but does not contact, a compressional transducer, and both are positioned such that the shear and compressional transducers contact a platen in about the same plane and, in a preferred embodiment, an oil decoupling film is provided between the compressional transducer and the platen which decouples the compressional transducer from the shear transducer.

In the prior art, as illustrated in the Steveninck article, above-mentioned, at page 380 thereof, in FIG. 3, there is illustrated a device for measurements under hydrostatic pressure in which there is shown a shear transducer atop a longitudinal or compressional transducer. That is to say, the longitudinal or compressional transducer is located between the shear transducer and the contact piece. In that article, it is stated that a series of experiments showed that the other side of the shear-wave transducer must be completely free; no backing material in any form should be used. Indeed, the article states at the top of column 1 of page 380 that the shear-wave transducer must be placed on the outside to avoid backing by any material other than air. The use of a delayed sweep, such as the Tektronix type 545, as can be used in this invention, is there set forth. The article also states that it is clear that, although the two types of transducers are cemented together, there is no interference from one pair when the other pair is in use.

Nevertheless, it remains a fact that the shear transducer must apply its shear through the longitudinal transducer which loads against the transmission of the shear wave. According to the arrangement herein described in which I have reversed the order of assembly and in a preferred embodiment of which I have provided a shear transducer as herein described, there can be obtained better definition of the shear sine wave as against the compression sine wave. In accomplishing the results which I have obtained, it is clear that I have proceeded contra to the teaching of Steveninck, as given in the article written by him and above identified.

For those who may be unfamiliar with magnetostrictive and piezoelectric transducers, it should be understood that a transducer, as herein discussed, responds to an electrical stimulus by producing a mechanical effect, i.e., force and motion, and, conversely, it translates a mechanical stimulus into an electrical signal. Magnetostrictive and piezolectric transducers are discussed in the above article in "Electrical Manufacturing." Suffice to say, that, as the magnetic or electric field impulses act upon the pieces of a shear or compressional transducer, as herein described, there will be a change in the physical dimension of each of the said pieces or elements.

In my new transducer, as herein described, the shear wave signals have been significantly improved by reversing the order in which the shear and compressional transducers were earlier applied to the specimen contact pieces. Oscillograms made with the contact pieces face-to-face show the increase in "first arrival" shear wave energy to be about five-fold over signals observed with the original transducer. There has been little, if any, loss in compressional wave signal owing to the change. The contact pieces of the invention are somewhat shorter than earlier used.

Referring again to the steveninck article, it will be noted that the two transducers are combined by rigidly cementing the shear element to the back of the compressional element. This rigid connection is essential in Steveninck's device because of the nature of shear wave transmission. However, this design, as earlier noted, causes the mass of the compressional element to load the shear unit, lowering resonant frequency and reducing signal levels.

Ordinarily, as used, a core testing apparatus or transmitter assembly is encompassed within an oil bath which simulates the pressure of the formation from which a core or formation sample has been taken.

As later described, in one embodiment there is employed a film of oil or grease between the adjacent faces of the shear and compressional transmitters, and, in another embodiment, there is employed an oil or grease film in the same plane as the shear and compression transducers contact the platen. This film of oil cannot transmit the shear energy, and, therefore, the mass of the compressional element is effectively decoupled from the action of the shear transducer. Nevertheless, the oil film provides adequate coupling for energy developed by the compressional element. As a result, overall performance of the sonic velocity apparatus over that of the prior art has been significantly enhanced.

Thus, in effect, increased shear and compressional signals are obtained in one embodiment for use in measuring the sonic velocity in core samples by placing oil coupling films and an electrode between the shear and compressional transmitters. The shear transmitter can be cemented directly to the specimen contact piece and both transmitters are immersed in oil and held against the core by a spring, as later described.

In another embodiment, an oil or grease decoupling film is placed between the compressional transducer and the platen. The shear transducer is of such size as to allow the compressional transducer to pass through, but not contact, the shear transducer. One end of the shear transducer is cemented to the platen and the other end of the shear transducer is cemented to the electrode. Since there is a space between the compressional transducer and the shear transducer, electrical contact between the two crystals is prevented. In this way the signal produced by the compressional transducer does not affect the shear transducer, and vice versa. However, the oil film between the compressional tranducer and platen serves to decouple the compressional transducer from the shear transducer and reduces the loading effects of the compressional transducer when the shear transducer is in operation.

It is an object of this invention to accomplish shear and/or compression transducing.

It is another object of the invention to provide a new shear transducer combination.

It is a further object of this invention to apply in a new arrangement a shear transducer and a compressional transducer to a core testing apparatus.

A still further object of the invention combination is to apply a new shear transducer to the new arrangement of a shear and compressional transducer in a core tester.

It is a further object of the invention to obtain clear and definite separation of shear and compressional signals or sonic waves transmitted through a core, as in a core testing operation or device.

A further object of this invention is to provide a coupling between the compressional transducer and the platen in a new arrangement.

A still further object of this invention is to provide an oil or grease decoupling film that decouples a compressional transducer from a shear transducer in the shear-compressional transducer combinations of the invention.

Other aspects, concepts, objects, and the several advantages of the invention are apparent from a study of this disclosure, the drawings, and the appended claims.

According to the invention, there is provided an apparatus for measuring characteristics of a core or formation sample by passing shear and compressional waves therethrough wherein there are provided in the apparatus contact pieces for holding between them a core or formation sample to be tested and wherein at least one shear transducer is placed immediately adjacent said contact piece. In this arrangement a shear signal can be induced without being loaded by the compressional transducer.

Still further according to the invention, the shear and compression transducer elements are assembled in a concentric arrangement, and both elements contact the platen in the same plane so that the time zero is the same for both the compressional and shear measurements.

Further according to the invention, at least one oil decoupling film and/or electrode is positioned between the shear and compressional transmitters or receivers or both when their positioning according to this invention is observed.

Still further according to the invention, an oil or grease decoupling film is placed between a compressional transducer and the platen holding same in a concentric arrangement where the compressional transducer is surrounded by a shear transducer which film decouples the compressional transducer from the shear transducer.

According to the invention as described in the several figures of the drawing, there can be obtained increased shear or compressional signals through core samples, velocities of which can be better measured and distinguished not only by virtue of the special structure of the shear transmitting and/or receiving element or elements, but also by virtue of the arrangement of a shear transducer between the compressional element or transducer and the core or sample or its respective contact piece.

Referring now to the figures of the drawing, in

FIG. 1 there is shown an apparatus for sonic velocity measurement as of rock or formation samples which is adapted to simulate conditions in the formation, for example, the pressure the sample would bear were it still in the formation and the connate water or brine it might be wetting the same.

FIGS. 1a and 1b show in expanded manner the details of the top and bottom structures of the device which include, respectively, on the one hand the shear and compressional transmitters and on the other the shear and compressional receivers.

FIG. 1c corresponds to FIG. 1a and shows in expanded form the bottom structure of another embodiment of the device which embodies a concentric arrangement of the shear and compressional transducers.

FIG. 2 shows in somewhat more detail details of an assembly somewhat like that of FIG. 1a, and FIG. 3 shows in somewhat more detail an assembly somewhat like that of FIG. 1b, FIGS. 2 and 3 also showing electrical leads and in diagrammatic form important pieces of apparatus employed in connection therewith.

FIG. 4 shows one form of the polysegmented structure of a shear transducer or wafer.

Figure 1A:
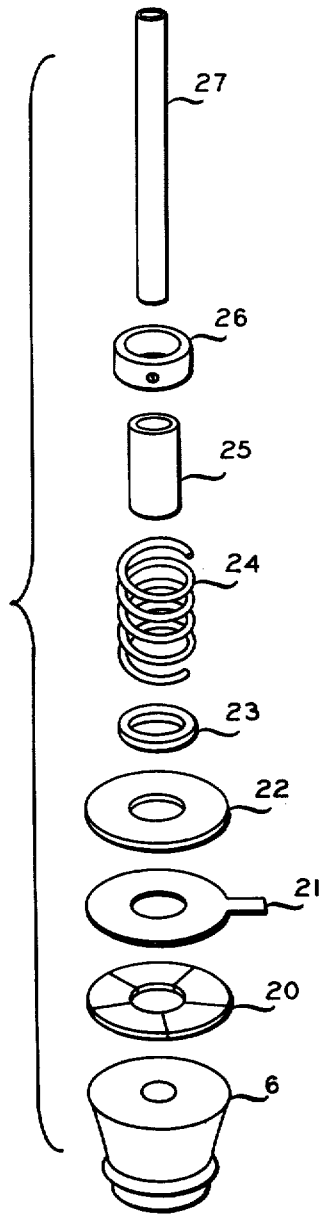
FIG. 1d shows a side view of the shear and compression transducers in concentric assembly.
FIG. 1e is a top view of FIG. 1d showing the concentric arrangement of the shear and compression tranducers.
Figure 1:
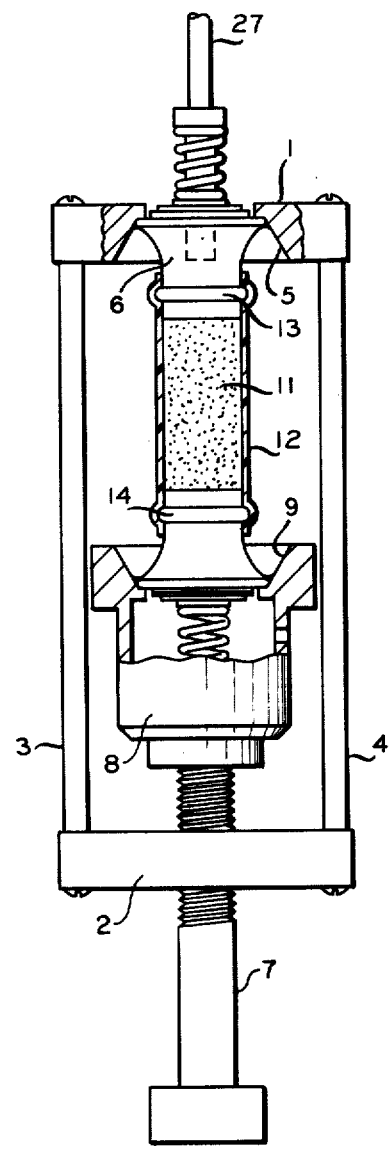

Referring now to FIG. 1, 1 and 2 are clamping members which are rodded together by several rods illustrated by rods 3 and 4. Member 1 is stationary on rods 3 and 4 and has formed within its recess 5 adapted to receive therein contact piece 6. Clamping member 2 is provided with screw press 7 equipped with movable recessed member 8 having recess 9 therein adapted to retainingly engage contact piece 10. A core or rock specimen 11 is held between contact pieces 6 and 10, and, in this embodiment, is surrounded by a rubber or plastic sleeve 12 sealingly protecting core 11 from any fluid which may be ambient around the area of the core. Bustle rings 13 and 14 are machined into contact pieces 6 and 10.

Referring now to FIG. 1a, there are provided together with and above contact piece 6, a shear receiver 20, an electrode 21, a compressional receiver 22, a fiber washer 23, a spring 24, an insulating sleeve 25, a collar 26, and a saturant tube 27. In FIG. 1a, saturant tube 27 is welded securely in contact piece 6. All of the elements 21 to 27 in FIG. 1 having a center opening are placed around saturant tube 27 and held in place by spring 24 which is kept under compression by collar 26. Collar 26 is held in place on saturant tube 27 by a recessed set screw (not shown). Contact pieces 10 and 6 are positioned in recesses 9 and 5, respectively, and held in place by epoxy cement as shown in FIG. 1. The contact pieces can be made to rest against O-ring washers which are positioned between the contact pieces and the recesses 5 and 9. Considering now FIGS. 1 and 1a, it will be seen that there can be introduced by means of saturant tube 27 to the core sample 11, for example, a brine solution to wet the core sample and also by means not shown applying to the brine a pressure to simulate that which the solution would have in the pores of the sample were it still in the ground. For example, if the core has been taken from a depth of 5,000 feet, multiplying by the factors 0.435, which has been determined for brine solution, it is necessary to use a brine pressure in the testing apparatus of 2175 pounds per square inch (0.435 × 5,000). The entire assembly of FIG. 1 can be placed in a pressure vessel and the formation pressure at the particular depth from which the core sample has been taken simulated. This pressure in the example given will be about 5,000 pounds per square inch. The function of the plastic sleeve 12 is now more readily apparent.

Figure 1B:
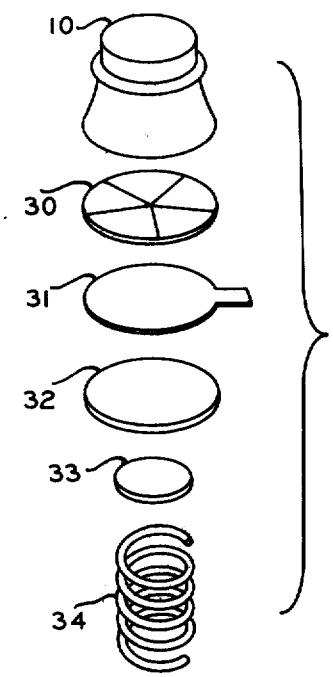

Referring now to FIG. 1b, there is provided below contact piece 10, shear transmitter 30, electrode 31, compressional transducer 32, fiber washer 33, and spring 34. Spring 34 may be a leaf or coil spring attached to 8 for holding the transmitter assembly against contact piece 10.

In one embodiment of the invention and in its preferred form, there is provided between electrode 31 and shear transmitter 30 an oil film. Likewise, there can be provided, according to the preferred embodiment of the invention, between electrode 21 and shear receiver 20 in FIG. 1a a similar oil film. The oil film or films function to permit motion of the shear receiver with respect to the compressional transducers as will be more apparent in connection with FIGS. 2 and 3.

Figure 1C:
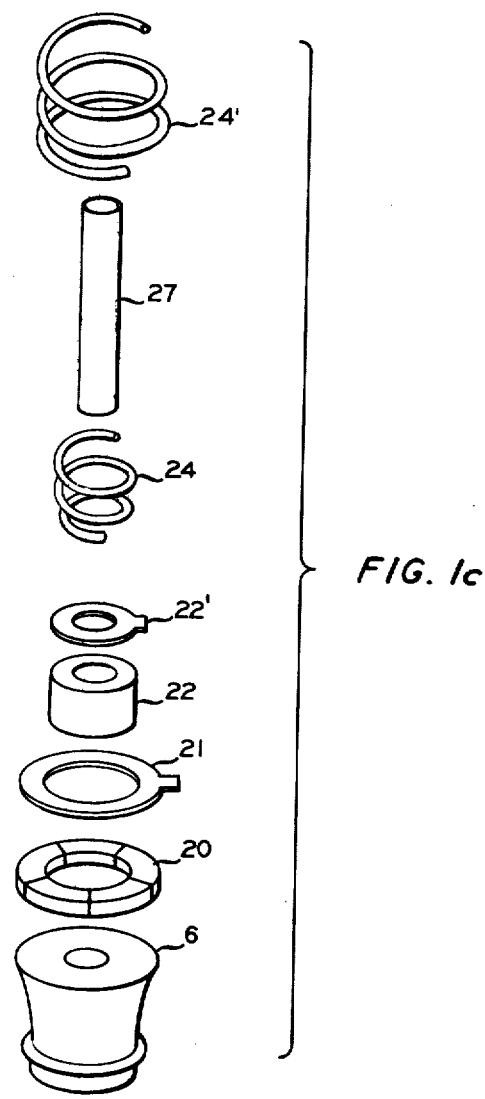

Referring now to FIG. 1c, which substantially corresponds to FIG. 1a described above, there is provided a contact piece on platen 6. Shear transducer 20 is in the same position with respect to platen 6 as described above with respect to FIG. 1a, but the hole through the center of shear transducer 20 is larger than the hole in the previously described shear transducer. The larger hole through the center is provided to allow insertion of a compressional transducer. The electrode 21 is cemented onto the shear transducer 20. The compressional transducer 22 is a cylindrical crystal and thicker than the one illustrated in FIG. 1a and also thicker than shear transducer 20. The compressional transducer 22 passes through the hole in electrode 21, and transducer 22 touches platen 6. An oil decoupling film is placed between compressional transducer 22 and platen 6. There is a cylindrical space between compressional transducer 22 and shear transducer 20 such as to prevent electrical contacts between the two crystals. In this way the signal produced by the compressional transducer does not affect the shear transducer and vice versa. However, the oil film between compressional transducer 22 and platen 6 serves as a decoupling film and reduces the loading effects of a compressional transducer when the shear transducer is in operation.

An electrode 22' is cemented to the top of compressional transducer 22. A coiled spring 24 is positioned above compressional transducer 22 and electrode 22'. Pipe 27 is used to supply the saturant for the core. In this connection, pipe 27 passes through the hole in platen 6, and, in this particular embodiment, both the bottom platen and top platen have pipe 27 through platen 6 so that saturant fluid can be supplied from both ends of the core. A coiled spring 24' is used in this embodiment to supply pressure on top of electrode 21 on top of shear transducer 20.

Figure 1D:
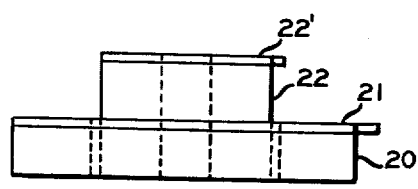

In FIG. 1d the outer circle is the shear transducer 20 with electrode 21 cemented on top thereof. The bottom portion of crystal transducer 20 is cemented to the platen as pointed out above. A space is provided inside the cylindrical section of shear transducer 20 through which compressional transducer 22 is placed. Electrode 22' is cemented to the top of compressional transducer 22, and the oil decoupling film being positioned below compressional transducer 22 between the top of platen 6. The oil film does not extend out beyond the outer edges of compressional transducer 22.

Figure 1E:
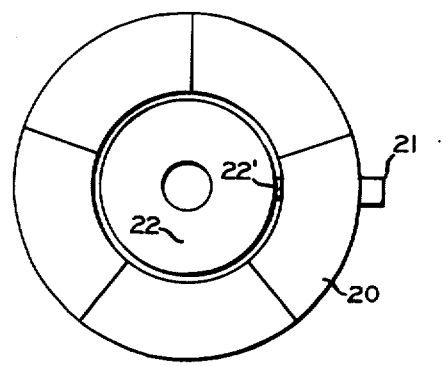

In FIG. 1e, which is a top view of FIG. 1d, there are illustrated the pie slices of shear transducer 20, the electrical insulating space between the compressional and shear transducers, and the hole in the center through which pipe 27 is placed to supply saturant fluid to the core under test.

In the embodiment described above in connection with FIGS. 1c, 1d, and 1e, the shear and compressional transducers are separated, and one does not tend to load the other. The transducers are separated by a large hole which is made in the shear transducer of such size as to allow the compressional transducer which is cylindrical to pass through the shear transducer. In this embodiment, one end of the shear transducer is cemented to the platen, and the electrode is cemented onto the other end of the shear transducer. The compressional transducer which is cylindrical passes through the large hole in the shear transducer and presses against the platen. An oil decoupling film is placed between the compressional transducer and the platen which reduces the loading effects of the compressional transducer when the shear transducer is in operation.

FIGS. 2 and 3 show, respectively, in exploded form, the assemblage of FIGS. 1a and 1b, respectively, but in more detail in that the electrical equipment is diagrammatically illustrated. Thus, in FIG. 3, there is shown electrical lead lines connecting oscillator 37 to the compressional element 32 by way of switch 35 and the electrode 31 by way of switch 36 to ground. As shown in FIG. 3, contact piece 10 is grounded by a suitable ground as is the oscillator. In more detail now, the spring 34 holds the assembly of FIG. 3 together against contact piece 10 and in order the compressional element 32 is coated with silver bearing epoxy cement, and electrode 31 is cemented to compressional element 32. Next is the oil film between electrode 31 and shear transmitter 30, the bottom side of which is coated with silver bearing epoxy and next the contact piece 10. The element 30 and contact piece 10 are cemented together with silver bearing epoxy cement or resin. The segments of shear transmitter 30 and shear receiver 20 are separated from each other by an electrical insulating epoxy cement. By operation of switch 35 and switch 36 together there are transmitted, usually sequentially, impulses by way of the respective transmitters 30 and 32. Thus, usually, one signal is produced so that only one transmitter is connected to the oscillator 37 while the remaining transmitter is disconnected from the oscillator.

Referring now to FIG. 2, electrical lead lines, respectively, connect the compressional element 22, the electrode 21, and the shear receiver 20 through switches 38 or 39 to detector and recorder 40. Oscillator 37 is connected to detector and recorder 40, such as an oscilloscope, by electrical cable 41 in order to provide synchronous operation of the two instruments in proper time relationship. The cementing, oil film, and coating are as before but symmetrically positioned with respect to the core located between contact pieces 6 and 10.

The plate electrode in both FIGS. 2 and 3 is cemented to the compressional transducer which is an ordinary cylindrical crystal about 1/10 inch thick. The shear transducer is about 1/20 of an inch thick.

Referring now to FIG. 4, there is shown a shear transducer. The arrows show the lining up of the pieces so that polarization of each segment or sector will be in the same direction and sense. The polarization is shown by the full arrows. The rotational motion during application of the field or current and return to rest position of each segment is shown by the broken double-headed arrows.

The pie-shaped crystals are portions of a rectangular block which is cut diagonally, the rectangular edges being rounded off to form the segments as shown.

The several segments are electrically insulated from each other by means of epoxy cement which holds them together. The insulation between the segments prevents shorting out of any segment and assures that it will contribute to producing shear forces.

Ordinarily, the electrical circuits of the invention carry oscillator generator signals having a frequency in the approximate range 500 to 1000 kilocycles per second, pulsed periodically to cause the crystals to engender the desired signals. In an actual operation, testing an oil-bearing formation core, a 700 kilocycle frequency was pulsed on both the shear and compressional transducers.

When so doing, the shear wave signals were significantly improved owing to having reversed the order in which the shear and compressional transducers were originally applied to the specimen contact piece. Oscillograms made with the contact pieces face to face show the increase in "first arrival" shear wave energy to be about five-fold over signals observed with the transducers in the original or unreversed order.

In carrying out tests on this instrument, the contact pieces 10 and 6 of FIGS. 2 and 3 were placed face to face with no core between the two. This test was used to determine time delay in the circuits and transducer assemblies with no core present and also to determine to relative strengths of the signals detected by the receiving transducers. Of importance to this invention, the order of placement of the transducers was reversed to that described here. It was found that with the arrangement of placing the shear transmitter and detector transducers adjacent the contact pieces (the compression transducers beyond the shear transducers) that a five-fold increase in the shear signal received at detector 40 was achieved over the conditions when the compressional transducers were adjacent the contact pieces (the shear transducers beyond the compressional transducers), with the same input pulses or signals. The tests were carried out in a pressure vessel with the transmitters and receivers under 5,000 lbs. per square inch pressure which simulates downhole pressures at a depth of 5,000 feet.

In making measurements using the apparatus of this invention, a ¾-inch diameter core is cut from a larger core obtained by well-known means from a well in the Panhandle Pool, More County, Tex. The cores are cylindrical and approximately 13/8 inch long. The cores are loaded into a Tygon sleeve with the sleeve ends being placed around the ends of the contact pieces as shown in FIG. 1. After the core has been inserted the lower contact piece is screwed up against the core in order that the core may be held tightly between the two end pieces. The core and apparatus of this invention are then ready for being tested in a pressure vessel (not shown). The pressure vessel is approximately 3 inches in inside diameter and 12 inches long with steel walls 1½ inches thick. The apparatus shown in FIG. 1 is bolted to the top end piece of the cylindrical pressure vessel which is screwed into place as is the bottom end piece. Both end pieces are equipped with electrical leads and pressure connections with the generating electrodes going through the bottom end piece and the receiving or pickup electrical leads coming out the top of the cylinder end pieces. The top cylinder end piece also has a tube connecting to tube 27 to supply internal pressure to the core as pointed out previously. The external pressure to the core is supplied through the bottom end piece of the cylinder wherein the pressures of up to 5000 pounds per square inch are injected around the core and Tygon cylinder. Once the end pieces of the pressure vessel have been screwed into place and oil pressure built up to 5000 pounds per square inch externally inside the pressure vessel and outside the Tygon tube, and 2175 pounds applied internally by injecting a brine solution through the tube leading to the core inside the Tygon tube, the equipment is ready for testing the core at ambient temperatures.

The receiving and transmitting shear transducers are ⅞ inch in diameter. The compressional transducers are ¾ inch in diameter and 1/10 inch thick while the shear transducers are only 1/20 inch thick. The ratio of the thickness of the compressional transducers to the shear transducers is 2:1, in order that they operate at their resonance frequencies since the velocities of sound in the two types of transducers have a ratio of 2:1. The receiving shear transducer differs from the transmitting transducer in that there is a hole placed through the middle of the receiving transducer in order to allow the tube carrying the internal pressure to the core to pass therethrough without coming in contact with the shear receiving transducer. The hole in the shear and compressional receivers is 3/16 inch in diameter which allows the ⅛ inch diameter injection tubing to pass therethrough without making electrical contact with the receiving transducers. Both shear transducers are made up of five segments cemented together with a small amount of epoxy cement electrically insulating the sectors from each other. This insulation between the sectors permits each individual sector to operate by itself and allows for individual testing of each sector to see if it is putting out or receiving energy before it is used in this test equipment.

A high-powered pulsed oscillator is used to supply electrical pulses to the transmitting transducers with the transmitted energy being received by the receiving transducers for display on the oscilloscope. The oscillator and oscilloscope are operated synchronously in order that the detected signals will appear at appropriate places on the oscilloscope. The individual transmitting transducers are operated separately and pulsed 200 times per second by means well known by those skilled in the electronics art in order to get a standing image on the oscilloscope. The duration of each pulse is 5 microseconds. The voltage applied to the transmitting transducers is 450 peak-to-peak volts. The oscillator puts out a 700 kilocycle per second frequency signal which is pulsed for 5 microseconds as pointed out above.

Figure 6:
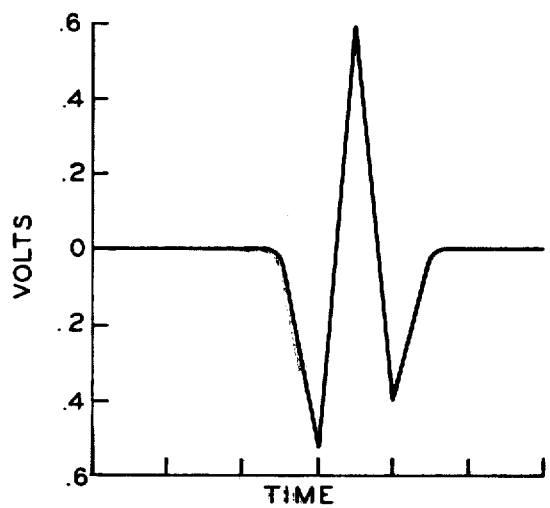
FIG. 6 shows the amplitude of the first break signal (downgoing pulse) produced at the shear receiving transducer by pulsing the shear transmitting transducer when the shear transducers are placed inside the compressional transducers and next to the contact pieces.
Figure 5:
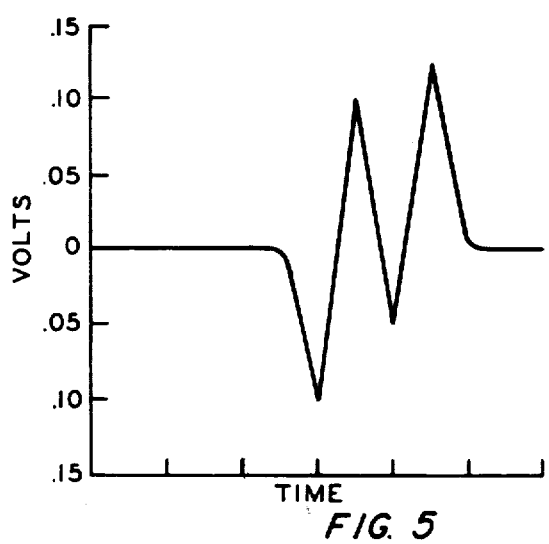
FIG. 5 shows the amplitude of the first break signal (downgoing pulse) produced at the shear receiving transducer by pulsing the shear transmitting transducer when the shear transducers are placed outside the compressional transducers.

In making tests on this equipment the relative strengths of the signals received at the receiving transducers as determined by the amplitude of the first break on the oscilloscope of the downgoing portion of the signal was made to determine whether or not more energy will be transmitted and received with the shear transducers placed next to the contact pieces as shown in FIG. 3 or whether or not more energy would be transmitted and received if the compressional transducers were placed next to the contact pieces. In making this test in particular with reference to the shear signals from the shear transducer the contact pieces 10 and 6 were placed face to face with no core between the two pieces in a Tygon tube. 5000 lbs./square inch of oil pressure was applied to the pressure vessel as previously described. No pressure was applied internally since the contact pieces would allow no significant pressure to be exerted against the Tygon tube since they were in contact face to face. The oscilloscope was adjusted for voltage reading per division, and readings made on the scope as shown in FIGS. 6 and 7. In this particular oscilloscope the divisions on its face were 1 centimeter along the horizontal and vertical axes. FIG. 5 shows the output signal for shear signals when the compressional transducer is placed next to the contact pieces (the shear transducers beyond the compressional transducers) and the shear transmitting transducer pulsed. FIG. 6 shows the results obtained by pulsing the shear transmitting transducer when it was placed next to the contact pieces (the compressional transducers beyond the shear transducers) as shown in FIGS. 2 and 3. The 700 kc signal was pulsed at 5 microseconds with 450 peak-to-peak volts and applied only to the shear transmitting transducer as described above. Data obtained from the receiving shear transducer are shown in Table I.

TABLE I

| | For Shear Signals | | |
|---|---|---|---|
| | With no core between contact pieces | | |
| | Scope Volts/Division | Reading on Scope in Divisions | Actual Volts |
| 1. Shear signals when shear transducers are placed outside of compressional transducers | 0.05 | 2.1 | 0.105 |
| 2. Shear signals when shear transducers next to contact pieces | 0.2 | 2.6 | 0.52 |

With the compressional transducers placed next to the contact pieces and the shear measurement taken, the adjustment on the oscilloscope was 0.05 volts/division. The reading on the oscilloscope was 2.1 divisions. Multiplying these two values together gives an actual voltage output for the shear transducer to be 0.105 volts. When the shear transducers were placed next to the contact pieces as shown in FIGS. 2 and 3, the volts/division on the oscilloscope was 0.2. The actual reading on the scope during pulsing of the shear transmitting transducer was 2.6. Multiplying these two values together gives an actual voltage of 0.52 for the transmitted shear signal. The amplitude read on the oscilloscope is shown in FIGS. 5 and 6 for shear pulsing and receiving under the two above conditions. Dividing 0.52 by 0.105 gives a five-fold increase of the shear signal when the shear transducers are placed next to the contact pieces over that for shear signals when the compressional transducers are placed next to the contact pieces.

Reasonable variation and modification are possible within the scope of the foregoing disclosure, the drawing, and the appended claims to the invention, the essence of which is that there have been provided transducer sonic velocity testing or measuring apparatus embodying a shear transducer and a compressional transducer wherein the order of assembly of the shear and compressional transducers has been reversed and in one modification an oil film is employed between the provided electrode and the compressional transducer, and, in another embodiment, an oil film is provided between the compressional transducer and the platen or contact piece in a concentric arrangement of shear and compressional transducers, and further that the shear transducer which can be used in such apparatus in a preferred embodiment is composed of pie-shaped segments.

I claim:

1. A transducer sonic velocity testing or measuring apparatus adapted to measure the respective velocities of rotational shear and compressional waves passed through a sample which comprises contact pieces for holding a sample such as a formation core therebetween, a rotational shear transmitter, and a compressional transmitter for transmitting, respectively, a rotational shear and a compressional wave through said sample, a rotational shear receiver and compressional wave receiver, respectively, for receiving a rotational shear and a compressional wave transmitted through said core, the apparatus being characterized in that at least one of the rotational shear transducers is positioned between a compressional transducer and the contact piece at an end of said core, and an oil decoupling film between one of the shear and one of the compressional transducers at said end.

2. An apparatus according to claim 1 having spring bias means for holding the rotational shear transducer and its corresponding compressional transducer together.

3. An apparatus according to claim 1 having means for supplying an electrical impulse to the rotational shear and compressional transducers, respectively, and means for receiving transmitted impulses or sonic waves and recording or otherwise displaying the same as received by the rotational shear and compressional receivers, respectively.

4. An apparatus which comprises contact pieces for holding a sample such as a formation core therebetween, a rotational shear transmitter and a compressional transmitter for transmitting, respectively, a rotational shear wave and a compressional wave through said sample, rotational shear wave and compressional wave receivers, respectively, for receiving a rotational shear wave and a compressional wave transmitted through said core, the apparatus being characterized in that at least one of the rotational shear transducers is positioned between a compressional transducer and the contact piece at an end of said core, and an oil decoupling film between the rotational shear transducer and the corresponding compressional transducer at said end.

5. An apparatus according to claim 4 having spring bias means for holding the rotational shear transducer and its corresponding compressional transducer together, means for supplying an electrical impulse to the rotational shear and compressional transducers, respectively, and means for receiving transmitted impulses or sonic waves and recording or otherwise displaying the same as received by the rotational shear and compressional receivers, respectively.

6. A transducer sonic velocity testing or measuring apparatus adapted to measure the respective velocities of rotational shear and compressional waves passed through a sample which comprises contact pieces for holding a sample such as a formation core therebetween, a rotational shear transmitter and a compressional transmitter for transmitting, respectively, a rotational shear and a compressional wave through said sample, a rotational shear receiver and compressional wave receiver, respectively, for receiving a rotational shear and a compressional wave transmitted through said core, the apparatus being characterized in that at least one of the rotational shear transducers is positioned between a compressional transducer and the contact piece at said end of said core, and an oil decoupling film between the rotational shear and compressional transmitters, the arrangement thereby permitting including a rotational shear wave without loading of the compressional transducer against said rotational shear wave.

7. A transducer sonic velocity testing or measuring apparatus adapted to measure the respective velocities of rotational shear and compressional waves passed through a sample which comprises contact pieces for holding a sample such as a formation core therebetween, a rotational shear transmitter and a compressional transmitter for transmitting, respectively, a rotational shear and a compressional wave through said sample, a rotational shear receiver and compressional wave receiver, respectively, for receiving a rotational shear and a compressional wave transmitted through said core, the apparatus being characterized in that one of the rotational shear transducers and a compressional transducer are both in contact in the same plane with the contact piece at an end of said core so that the time zero is substantially the same for both the compressional and shear measurements, and an oil decoupling film between the compressional transducer and the contact piece at said end which decouples the compressional transducer from the shear transducer.

8. An apparatus according to claim 7 having spring bias means for holding the rotational shear transducer and its corresponding compressional transducer together.

9. An apparatus according to claim 7 having means for supplying an electrical impulse to the rotational shear and compressional transducers, respectively, and means for receiving transmitted impulses or sonic waves and recording or otherwise displaying the same as received by the rotational shear and compressional receivers, respectively.

10. An apparatus which comprises contact pieces for holding a sample such as a formation core therebetween, a rotational shear transmitter and a compressional transmitter for transmitting, respectively, a rotational shear wave and a compressional wave through said sample, rotational shear wave and compressional wave receivers, respectively, for receiving a rotational shear wave and a compressional wave transmitted through said core, the apparatus being characterized in that at least one of the rotational shear transducers surrounds, but does not contact, the compressional transducers and both are in contact in the same plane with the contact piece at an end of said core so that the time zero is substantially the same for both the compressional and shear measurements, and an oil decoupling film between the compressional transducer and the contact piece at said end which decouples the compressional transducer from the shear transducer.

11. An apparatus according to claim 10 having spring bias means for holding the rotational shear transducer and its corresponding compressional transducer together, means for supplying an electrical impulse to the rotational shear and compressional transducers, respectively, and means for receiving transmitted impulses or sonic waves and recording or otherwise displaying the same as received by the rotational shear and compressional receivers, respectively.

12. A transducer sonic velocity testing or measuring apparatus adapted to measure the respective velocities of rotational shear and compressional waves passed through a sample which comprises contact pieces for holding a sample such as a formation core therebetween, a rotational shear transmitter and a compressional transmitter for transmitting, respectively, a rotational shear and a compressional wave through said sample, a rotational shear receiver and compressional wave receiver, respectively, for receiving a rotational shear and a compressional wave transmitted through said core, the apparatus being characterized in that one of the rotational shear transducers is formed of pie-shaped segments bonded to a contact piece and through an enlarged axial opening in the shear transducer a smaller, but thicker compressional transducer is mounted and coupled to the contact piece at an end of said core, and an oil decoupling film between the compressional transducers and the contact piece at said end which decouples the compressional transducer from the shear transducer.

13. An apparatus according to claim 12 wherein the shear transducer is a ring-shaped segmented transducer surrounding, but not contacting, the compressional transducer.

14. A transducer sonic velocity testing or measuring apparatus adapted to measure the respective velocities of rotational shear and compressional waves passed through a sample which comprises contact pieces for holding a sample such as a formation core therebetween, a rotational shear transmitter, and a compressional transmitter for transmitting, respectively, a rotational shear and a compressional wave through said sample, a rotational shear receiver and compressional wave receiver, respectively, for receiving a rotational shear and a compressional wave transmitted through said core, the apparatus being characterized in that at least one of the rotational shear transducers is positioned next to the contact piece at an end of said core, and an oil decoupling film below one of the compressional transducers at said end which decouples the compressional transducer from the shear transducer.

15. An apparatus according to claim 14 having spring bias means for holding the rotational shear transducer and its corresponding compressional transducer together, means for supplying an electrical impulse to the rotational shear and compressional transducers, respectively, and means for receiving transmitted impulses or sonic waves and recording or otherwise displaying the same as received by the rotational shear and compressional receivers, respectively.

* * * * *